United States Patent
Blum et al.

(10) Patent No.: US 6,240,285 B1
(45) Date of Patent: May 29, 2001

(54) ALTERNATIVE CARRIER SELECTION ON REPEAT EMERGENCY CALLS

(75) Inventors: Thomas C. Blum, Annandale; Richard L. Harvey, Neshanic Station; Lee J. Whritenour, West Milford, all of NJ (US)

(73) Assignee: Bell Atlantic Mobile, Inc., Bedminster, NJ (US)

(*) Notice: Subject to any disclaimer, the term of this patent is extended or adjusted under 35 U.S.C. 154(b) by 0 days.

(21) Appl. No.: 09/221,570

(22) Filed: Dec. 29, 1998

(51) Int. Cl.[7] ................................................. H04M 11/00
(52) U.S. Cl. ........................... 455/404; 455/460; 455/564
(58) Field of Search .................................... 455/404, 510, 455/460, 414, 436, 552, 564, 521; 379/201, 356; 375/357

(56) References Cited

U.S. PATENT DOCUMENTS

| | | | |
|---|---|---|---|
| 4,052,570 | * 10/1977 | Sutton | 379/357 |
| 5,365,570 | * 11/1994 | Boubelik | 455/565 |
| 5,388,147 | 2/1995 | Grimes . | |
| 5,519,760 | 5/1996 | Borkowski et al. . | |
| 5,548,583 | 8/1996 | Bustamante . | |
| 5,563,931 | * 10/1996 | Bishop et al. | 455/404 |
| 5,937,344 | * 8/1999 | Zicker | 455/404 |
| 5,937,355 | * 8/1999 | Joong et al. | 455/466 |
| 6,026,305 | * 2/2000 | Salinger et al. | 455/456 |
| 6,038,437 | * 10/2000 | Zicker | 455/404 |
| 6,101,240 | * 8/2000 | Blair et al. | 379/45 |

* cited by examiner

Primary Examiner—Dwayne Bost
Assistant Examiner—Sonny Trinh
(74) Attorney, Agent, or Firm—McDermott, Will & Emery (57) ABSTRACT

Wireless telephone networks, such as cellular, PCS networks, and other mobile radio services networks provide 911 or similar emergency calling services between mobile stations and a public safety answering point (PSAP). In emergency situations, the caller often will not be satisfied with the quality of the link to the PSAP, for any of a variety of subjective reasons. In such a case, the caller ends the first emergency call and initiates another emergency call. In accord with the invention, if the caller initiates the second emergency call within a predetermined interval from the first call, the mobile station will select an alternate operating system of the network for the second call. For example, if the first call utilized the A-side cellular carrier, the handset will select a B-side or PCS carrier for the second call. The handset also may select a different technology, e.g. analog instead of the normally preferred digital, for the second emergency call. The expectation is that conditions will be different on the alternate operating system and provide a quality of service that the emergency caller subjectively finds more acceptable.

31 Claims, 3 Drawing Sheets

ALTERNATIVE CARRIER SELECTION ON REPEAT EMERGENCY CALLS

TECHNICAL FIELD

The present invention relates to techniques for maximizing the reliability of establishing and maintaining from a mobile wireless terminal an acceptable connection to a 911 or like emergency call and public safety answering point (PSAP).

BACKGROUND

In recent years, cellular telephones have emerged as a must-have appliance among mobile professionals and consumers alike, growing in popularity every year since they were first introduced more than fifteen years ago. Cellular telephones, once considered a status symbol by many, have become an integral link to our telecommunications infrastructure in support of an increasingly mobile society. Their widespread use for both voice and data communications has resulted from significant progress made in their portability, network services availability, and the miniaturization and declining cost of chips, memory, and other components. These factors, combined with a widespread public understanding of how mobile communications can enhance business and personal communications, as well as contribute to personal security, have resulted in the sustained high growth of cellular telephone usage.

The Advanced Mobile Phone Service (AMPS), which is the standard for analog cellular networks today, operates in the 800–900-MHz range. AMPS set the stage for the explosive growth of cellular service, which continues today. AMPS supports automatic roaming, so that mobile phone users can continue to use their phones as they move into an area served by a different network. However, analog signals have their limitations, and digital technology is advancing on all communication fronts. A digital version of AMPS solves many of these problems while providing increased capacity and a greater range of services. Both analog and digital signals operate in the 800-MHz band and can coexist with each other.

Digital radio transmission can be implemented with time division multiple access (TDMA) as the underlying technology. TDMA provides ten to fifteen times more channel capacity than AMPS networks and allows the introduction of new feature rich services such as data communications, voice mail, call waiting, call diversion, voice encryption, and calling line identification. A digital control channel supports such advanced features as a sleep mode, which increases battery life on newer cellular phones by as much as ten times over the current battery capabilities of analog phones. Digital can also be implemented with code division multiple access (CDMA) technology to increase channel capacity by as much as a factor of twenty.

The radio frequencies used for communication between the mobile user and the cell site are in the range of 825 to 890 megahertz (MHz). Separate channels are utilized for transmitting and receiving voice communications, and the telephone equipment allows transmit and receive channels to be utilized simultaneously so that the parties communicating with each other experience a full-duplex conversation not unlike that of a conventional wireline telephone. Additional radio communications between the telephone or handset and the cell site takes place over control channels that exchange data between the telephone and the cellular network as to the active phones operating within a particular service area. These control channels also provide functions critical to the establishment of calls and the management of the voice communications channels.

Since a cellular telephone is so dependent upon a radio link to establish and maintain communications, most of the factors that affect their operation are related to aspects of radio technology. Some of these factors are outside the control of the end user and are specific to the engineering of the carrier's network. The location of cell sites, proximity of adjacent cells, transmitter power, receiver sensitivity, and antenna location can all have a significant impact on the quality of communications. In many locations, service quality between providers is virtually indistinguishable. At the same time, it is commonplace that each service provider will have areas in which strengths and weaknesses exist, especially pertaining to signal coverage in any specific location. The areas of strengths and weaknesses may or may not coincide.

An additional factor somewhat beyond the control of the user is that of network traffic loading. Service can suffer even on the best of networks merely due to the congestion that results when too many users attempt to access the network at once.

In addition to classic cellular telephony, Personal Communications Services (PCS), satellite based communication, and Specialized Mobile Radio (SMR) represent later advancements in cellular telephony. By the year 2002, it is anticipated that as many as sixty million individuals in North America will subscribe to one or more of the PCS services then available. There are several categories of PCS: narrowband, wideband, and unlicensed. Narrowband PCS is intended for voice communication, two-way paging, and other types of communications that handle small bursts of data. These services have been assigned to the 900-MHz frequency range, specifically 901 to 912, 930 to 931, and 940 to 941 MHz.

Wideband PCS is intended for more sophisticated services. In addition to supporting voice communication, wideband PCS supports file transfers and LAN interconnection. These types of services will compete with cellular communications and use a frequency range that encompasses microwave users. Some microwave systems operate from 1850 to 1990 MHz. The FCC has opened up this range for wideband PCS with the understanding that microwave users will eventually migrate out of that area of the spectrum.

With the current generation of cellular service, subscribers can activate and modify their own cellular telephones without third-party involvement. Illustrative of such over-the-air programming systems are Lucent Technologies' AUTOPLEX Series II cell sites with Digital Control Channel (DCC) software based on the IS-136 standard. The system enables cellular service providers to offer enhanced features and services over existing TDMA-based digital cellular telephone networks. DCC allows cellular operators to offer multiple digital wireless services, including over-the-air programming, tailored to individual subscriber needs. It interworks with existing analog infrastructure, providing operators a gradual and cost effective migration to digital. Nortel (Northern Telecom) also supports the Digital Control Channel in its DMS-MTX wireless Systems. Multimode and multiband refers to a type of wireless system that supports more than one technology for its mode of operation and more than one frequency band. An example of a multimode wireless system is one that supports both American Mobile Phone Standard (AMPS) and Code Division Multi-Access (CDMA) systems for analog and digital communication, respectively. An example of a multiband wireless system is one that supports both 800 MHz and 1900 MHz for cellular and Personal Communications Services (PCS), respectively. It will be appreciated that wireless telephone systems can be both multimode and multiband, depending on the standards and frequencies supported.

Multimode and multiband wireless systems allow operators to expand their networks to support new services where they are needed most, expanding to full coverage at an economically sound pace. From the subscriber perspective, multimode and multiband wireless systems allow them to take advantage of new digital services that are initially deployed in large cities, while still being able to communicate in areas served by the older analog technologies.

QualComm has been offering dual-mode AMPS/CDMA handsets since 1995. Its QCP-800 portable cellular phone operates at 800 MHz. Using CDMA technology, the QCP-800 portable phone offers coverage while transmitting at RF power levels of only a fraction as much as an analog cellular phone. QualComm also now offers a dual-band, dual-mode phone that provides expanded coverage for today's PCS only subscribers. The almost universal modern day offering of telephonically available emergency assistance through a 911 type service is now regarded as a virtual necessity. Public Safety Answering Points or Positions (PSAPs) have been defined and established to serve this purpose. Pubic Safety Answering Points are customarily segmented as "primary," "secondary," and so on. The primary PSAP is the first contact a 911 caller will get. Here, the PSAP operator verifies or obtains the caller's whereabouts (called locational information), determines the nature of the emergency, and decides which emergency response team or tearms should be notified. In most cases the caller is then conferenced or transferred to a secondary PSAP from which help will be dispatched. Secondary PSAPs might be located at fire dispatch areas, municipal police force headquarters, or ambulance dispatch centers. Often the primary PSAP will answer for an entire region.

Wireless telephones have received wide acceptance for use in cellular, PCS, and like systems, and wireless user premises equipment applications. In order to satisfy the PSAP need, such telephones and the systems in which they are operated must provide a PSAP service which is at least roughly comparable to the service provided in the wired network.

When a user makes an emergency 911 call on a standard wired telephone, the location of the user is quickly determined because the physical location of the telephone is known and unchanging. It has been noted that when a user makes an emergency 911 call on the new wireless systems it may be difficult to identify the exact location of the user, thereby making it difficult to provide emergency service to the caller in a timely manner. The reason for this is that a user operating within a wireless telephone system is not bound to remain in one given physical location, since the users can travel anywhere within the physical bounds of the total system. Thus as a user moves about physically or roams, the telephone call is "handed off" from one base station to another. Thus, when operating within a wireless system it is necessary 1) for the user to always have access to the wireless telephone system within a reasonable period of time, 2) for the 911 system to identify the base station through which the call is being made, and 3) that a physical location determination of the user handset relative to the base station be easily and quickly computed. Based on the realization of these added requirements, the FCC has defined an "Enhanced 911" requirement which must provide these capabilities in all future wireless telephone systems.

Modern wireless telephone systems have largely overcome the early problem of providing satisfactory determination of mobile station location in a 911 or PSAP situation. Typical examples of such mobile locating systems are described in U.S. Pat. No. 5,388,147, issued to Grimes, Feb. 7, 1995, for Cellular Telecommunication Switching System for Providing Public Emergency Call Location Information, U.S. Pat. No. 5,548,583, issued to Bustamante, Aug. 20, 1996, for Wireless Telephone User Location Capability for Enhanced 911 Application, and U.S. Pat. No. 5,519,760, issued to Burkowski et al. May 21, 1996, for Cellular Network Based Location System. However, the satisfactory use of wireless telephone systems with PSAPs for summoning emergency aid still faces other signicicant obstacles.

The reliability and quality of mobile wireless service is notoriously dependent upon the characteristics of the link which is provided. The characteristics of the link in turn are dependent on a large number of differing types of variables. By way of illustration these variables include but are not limited the following: In a cellular system the changing position of the mobile unit within the active cell affects the interface to the system. All mobile wireless systems must cope with the frequently unpredictable nature of radio wave propagation. Obstructions and fading cause disturbances. Omnidirectional antennas are needed to reach the remote units of roaming users, and user carried units have a relatively low limit to the power that they can use and radiate. The remote unit frequently operates in an undesirable noise environment, for example, noise from auto ignition and auto charging systems. The base station is attempting to communicate with a target which may be continually moving. Changes in propagation cause frequently unpredictable variables in the quality of the link.

While the foregoing variables are illustrative of numerous potential obstacles to establishing and maintaining a quality radio link, they do not constitute the sole type of obstacle. As an example, the quality of the communication link may be fully acceptable, but the confidence level in locating the roamer may be only 2 percent. In a variation of this scenario the caller makes a fully acceptable connection to the PSAP but the PSAP attendant says "I am unable to locate you." This particular problem creates abortive circumstances independent of the quality of the available signal path. In addition, when speaking of the signal link, it is the individual user who is the ultimate subjective judge. If the user deems the connection objectionably deficient for any of a variety of subjective reasons, and hangs up to try again, the objectively acceptable link has failed. However, if the dissatisfied emergency caller redials immediately after hang-up, the network reestablishes virtually the exact same unsatisfactory link from the mobile station to the PSAP.

A need exists for overcoming these problems in mobile wireless telephone operation relying on PSAPs.

DISCLOSURE OF THE INVENTION

The invention addresses the foregoing needs and automatically provides a substitute for the initially provided PSAP connection link when the user rejects the first link and promptly presents a renewed request.

It is a prime object of the invention to detect a user rejection of and renewed request for a PSAP emergency connection from a wireless telephone, and provide an alternate connection to an alternate carrier.

It is still another object of the invention to detect the failure and renewal of a wireless phone attempt to establish acceptable connection in a 911 or PSAP situation and provide an effective connection via an alternate carrier, technology, and/or link.

It is another object of the preferred embodiments of the invention to provide a method for implementing public emergency calling services to a wireless telephone station in a communication network. The network includes wireless telephone stations linked by multiple operating systems via wireless and switched telephone networks to each other and to wired telephone stations and to a public safety answering point. The method involves detecting the termination and re-initiation within a predetermined time period of a call from one of the wireless telephone stations to a public safety answering point, and directing the re-initiated call via a different operating system.

The different operating system may provide a different mode of service, e.g. analog instead of digital. Preferably, the alternate operating system is one operated by a different carrier, e.g. a secondary carrier as opposed to the customer's preferred carrier.

It is yet another object of the invention to provide an improved mobile handset for use in such a system and method.

One aspect of the invention relates to a situation wherein wireless telephone networks, such as cellular and PCS networks, provide 911 or similar emergency calling services between mobile stations and a public safety answering point (PSAP). In emergency and sometimes near panic situations, the caller often will not be satisfied with the quality or some other aspect of the link to the PSAP, for a variety of objective and/or subjective reasons. In such circumstances, the caller is frequently in a state of high emotion or near panic and is prone to terminate the initial emergency call and immediately or very promptly initiate another call. In accord with this aspect of the invention, the very rapid initiation of the second emergency call within a predetermined brief interval from ending the first call, will cause the mobile station to select the network of an alternate carrier for the second call. For example, if the first call utilized the Aside cellular carrier, the handset will select a B-side or PCS carrier for the second call. The expectation is that conditions will be different on the alternate network and provide a quality of service that the emergency caller subjectively finds more acceptable.

As another embodiment of the invention, the second selection for routing the second call may comprise an alternate carrier but also may use a different technology or mode alone or preferably in combination with an alternate carrier selection. Thus while the first call may have utilized an analog technology, the immediately following call may use a digital technology or vice versa.

In certain preferred embodiments, another object of the invention is to provide to the user a simple mechanism for quickly originating emergency calls despite the distraction of the user under the circumstances. Thus it is preferable to provide the user with one stroke call initiation by a single stroke of an emergency key marked for that purpose.

Another preferred aid to the user which is provided in accord with another aspect of the invention is to incorporate with such an emergency key an automatic turn on function for the handset. Thus if the wireless unit is in an off condition when the emergency key is depressed, the handset is immediately and automatically turned on without the necessity of an extra manual turn on by the user.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

DETAILED DESCRIPTION OF THE PREFERRED EMBODIMENTS

The invention involves alternate selection of operating systems within a wireless communication network when a user repeatedly initiates emergency calls from a mobile station, one after another, within a predetermined interval. Typically, a user will attempt a first emergency call, and the user's mobile station initiates the call over the user's primary carrier. However, if the call terminates and the user initiates a subsequent emergency call within the interval, for example because the user is not satisfied with the quality of the link via the primary carrier, the user's mobile station initiates a second call. However, on the second call, the mobile station selects a different operating system within the overall public wireless network. In the preferred embodiments, the mobile station selects an alternate carrier's network for the second call, in the expectation that conditions will be different on the alternate network and provide a subjectively more acceptable quality of service.

The term "operating system" is used to refer to a logical system or segment of wireless communications system that has access to a 911 PSAP. The different operating systems may be networks or network segments operated by different, even competing carriers. Different operating systems may use different technologies within one carrier's network, typically to provide different bands or modes of service. A typical example of a carrier's network having different operating systems is a network having equipment to support digital service and equipment to support analog service.

The invention encompasses selection of alternate carriers and selection of alternate modes. The phone could select the same carrier's alternate mode, for example analog instead of digital. In the preferred embodiment, even if the wireless station selects an alternate mode, it also selects an alternate carrier. The phone may also select an alternate band.

Figure 1:
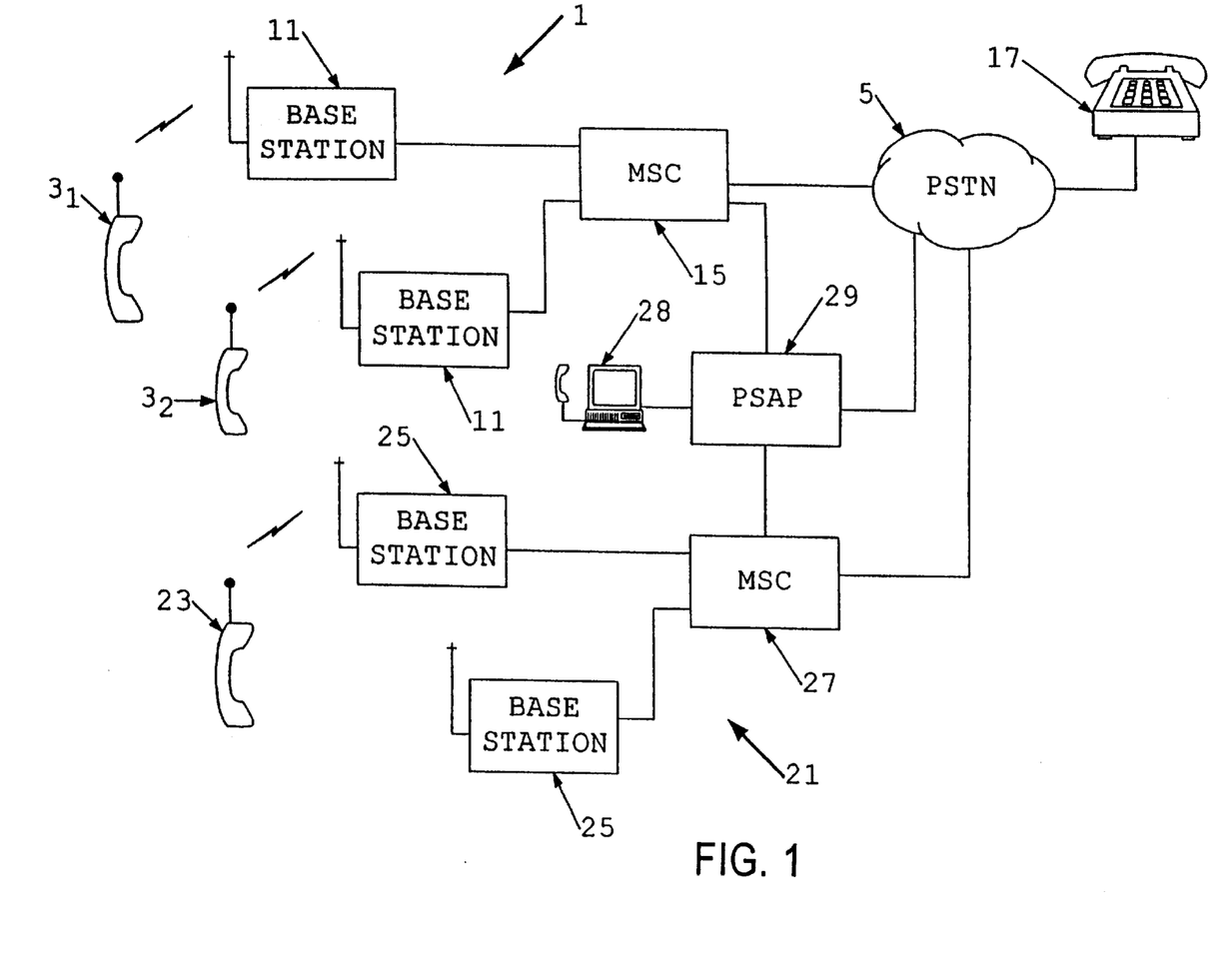
FIG. 1 is a simplified block diagram of a network for use with mobile units implementing the alternative carrier selection in accord with the present invention.

FIG. 1 depicts a system for providing voice telephone communications as well as emergency call and associated locator services, in accord with the invention. As shown, a first wireless telephone system 1 provides cellular or personal communications service (PCS) type services or other wireless communications service (e.g. satellite based services) to mobile stations depicted by way of example as mobile handsets 3. The network 1 enables users of the mobile stations 3 to initiate and receive telephone calls to each other as well as to telephones 17 accessible through the public switched telephone network (PSTN) 5.

The wireless telephone network 1 may be analog, or the network may utilize any of the common digital standards for wireless telephone services. In the preferred embodiment, the network 1 is a dual-mode network, providing a standard digital service as well as analog cellular telephone service. In such a network, some of the mobile stations 3 will be analog stations, some of the mobile stations 3 will be digital stations, and many of the mobile stations 3 will be dual-mode units containing both analog and digital transceivers.

FIG. 1 shows a simplified version of a common wireless telephone network 1. The network 1 includes a number of wireless base stations 11, typically providing wireless radio coverage over the geographic area serviced by the network 1. In the preferred embodiment, the base stations include both analog and digital service transceivers. The base stations 11 send and receive radio signals communicated to and from compatible mobile stations 3. The base stations 11 also communicate over trunk circuits to a mobile switching center (MSC) 15. The MSC 15 controls the operations of the network 1 and provides selective switched connections. The switched connections through the MSC 15 may connect base stations together, for example to enable calls between two mobile units $3_1$, $3_2$. The switched connections through the MSC 15 also provide selected call connections to the PSTN 5, for example to allow a user of mobile handset $3_1$ to make a call to or receive a call from one of a landline telephone station shown for example at 17.

The analog service of the network 1 typically conforms to the Advanced Mobile Phone Service (AMPS) standard. Preferably, many of the mobile stations 3, the base stations 11, and the MSC 15 also implement a standard digital air-link interface. Digital wireless equipment is available today to support any one of several common standards, including time division multiple access (TDMA) and the Global System for Mobile communications (GSM). The preferred embodiment of the digital wireless portion of the network 1 supports the code division multiple access (CDMA) standard.

With CDMA, each transmitted signal comprises a different pseudorandom binary sequence, also referred to as a pseudonoise (PN) sequence, which modulates a carrier signal, spreading the spectrum of the waveform. Thus, since each CDMA subscriber unit is assigned a unique PN code, a plurality of subscriber stations can send and receive CDMA signals sharing the same frequency spectrum. If these CDMA signals were viewed in either the frequency or time domain, the multiple access signals would appear to be superimposed on top of each other. The CDMA signals are separated in the receivers of the base stations or the subscriber stations by using a correlator which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system. CDMA interference therefore can be controlled, with the goal of increasing system capacity, on the basis of the reduction in signal-to-noise ratio caused by other users within the cellular CDMA system.

In the illustrated example, assume that a first carrier operates the dual-mode analog and CDMA type wireless telephone network 1. The users of the handsets $3_1$, $3_2$ subscribe to services of the first carrier, and their handsets are programmed to recognize the network 1 as that of the primary carrier.

In today's competitive telecommunications environment, many areas also have one or more additional carriers operating a second wireless telephone network 21. If the primary carrier is a cellular carrier, the other carrier may be the second cellular provider in the area, a provider of personal communication service (PCS), or any other provider of wireless radio telecommunication services operating in the same or an overlapping area.

The second carrier's network 21 normally provides cellular or PCS type services to mobile stations depicted by way of example as another mobile handset 23. The network 21 enables users of the mobile stations 23 to initiate and receive telephone calls to each other, to users of the network 1 and to telephone stations 17 through the PSTN 5, in essentially the same manner as the first network 1. The wireless telephone network 21 may be analog and/or digital, but for purposes of this discussion assume that the network 21 provides either analog or digital service in a form compatible with the handsets 3 of the users of the first carrier's network 1.

PCS or personal communication service is a relatively new, low powered, higher frequency competitive technology to cellular. Wherein cellular typically operates in the 800–900 MHz range, PCS operates in the 1.5–1.8 MHz range. The concept with PCS is the handsets or telephones will be less expensive, have less range, and be digital, the cells would be smaller and closer together. PCS is presently mostly a city system.

FIG. 1 shows a simplified version of the second wireless telephone network 21. The network 21 includes a number of wireless base stations 25 for providing cellular radio coverage over the service area of the second carrier. The service area of the second carrier overlaps that of the first carrier. The base stations 25 include either analog or digital transceivers compatible with the mobile stations 23 as well as many of the stations 3 of the first carrier's customers. The base stations 25 send and receive radio signals communicated to and from compatible mobile stations and communicate over trunk circuits to a mobile switching center (MSC) 27. The MSC 27 controls the operations of the network 21 and provides selective switched connections between base stations and between base stations and the PSTN 5. The operation of the mobile network 21 is generally similar to that of the first carrier's mobile network 1 but in some cases the technology used to provide wireless service may be different (e.g. satellite).

The public safety answering point or PSAP 29 is the facility at which emergency telephone calls are answered and the provisioning of emergency services is initiated. Whereas, the 911 number is the most common emergency number, various local governmental agencies have set up other emergency telephone numbers which are also transferred to such a PSAP. The PSAP 29 responds to emergency telephone calls received when these other emergency telephone numbers are dialed in the same manner as it responds to an emergency call dialed using the 911 number. The PSAP 29 may be an E911 emergency system. Systems of this kind are well known. (See, for example, "E911 Public Safety Answering Point: Interface Between a 1/1AESS Switch and Customer Premises Equipment", Technical Reference TR-TSY-000350, Issue 1, November 1987, by Bell Communications Research). PSAP 29 includes a 911 automatic number identification (ANI) controller which may run AT&T automatic call distribution (ACD) software. The controller provides private branch exchange (PBX)-type functions for the incoming emergency calls, including call switching functions and call-distribution functions to emergency service agents' positions, such as the exemplary position 28. The PSAP 29 includes a plurality of agent positions for answering the emergency calls.

Unlike a conventional PSAP, PSAP 29 is capable of providing emergency service not only for wired telephones 17 but also cellular or PCS terminals such as 3 and 23. The cellular networks 1 and 21 and the PSAP 29 interact to determine the physical location of the mobile station of the emergency caller. For example, the handset may have GPS capability. When the call is an emergency call from a wireless terminal, the handset terminal determines its geographical geo-coordinate information using an attached GPS device (not shown), and transmits this along with the emergency call information to the PSAP. Thus, the PSAP is informed as to the location of the wireless terminal originating the emergency call. A PSAP of the type which has been briefly described here is shown and described in more detail in U.S. Pat. No. 5,388,147, earlier mentioned. That description and the drawings related thereto are incorporated by reference herein in their entirety. Other technologies for determining the location of the handset and providing the location data to the PSAP 29 also are known and becoming more readily available in the wireless communication industry.

Figure 2:
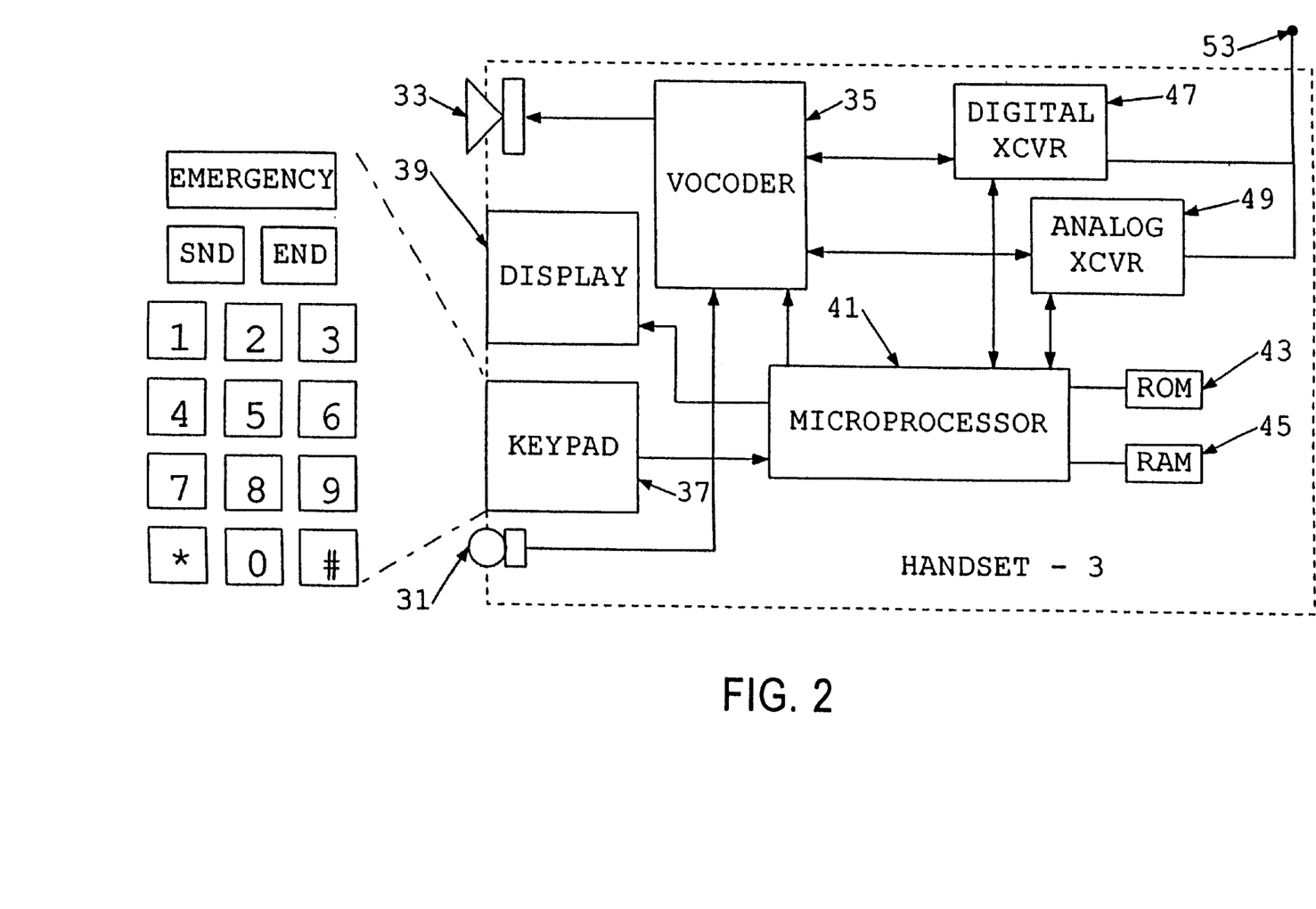
FIG. 2 is a functional block diagram illustrating one implementation of a mobile telephone in accord with the invention, for use in the network of FIG. 1.

FIG. 2 shows one implementation of a handset 3. The handset is essentially a standard dual-mode type wireless telephone, as commonly used in cellular or PCS type networks. The handset 3 includes a microphone 31 for detecting audio frequency sonic energy and generating corresponding analog electrical signals. The handset 3 also includes a speaker for generating audio frequency sonic energy in response to analog signals.

The microphone 31 and speaker 33 connect to voice coding and decoding circuitry (vocoder) 35, which provides two-way conversion between analog audio signals and digital speech samples at a compressed bit rate compatible with the digital operations of the wireless telephone network 1. However, the handset 3 also operates in an analog mode. Either within the vocoder 35 or as a separate element (not shown), the handset 3 includes circuitry to bypass the digital elements of the vocoder, so as to pass analog signals directly to and from the speaker 33 and the microphone 31.

The digital handset 3 also incorporates a keypad 37, to allow the user to input digits. The keypad typically takes the form of a ten-digit (0–9) keypad with two additional keys (*, #). For the cellular services, the keypad usually includes some extra keys, such as a "TALK" or SEND (SND) key and an "END" key as well as some special function keys (not shown) to control certain text and menu functions. In the presently preferred embodiment, the keypad 37 also includes a separate key labeled for emergency calls. The label may be textual or symbolic. The user can activate this key to cause the handset 3 to automatically initiate an emergency call to the PSAP 29. The handset 3 also includes a display 39, for displaying dialed numbers, menus, speed dial lists, incoming caller identifications, and the like.

A microprocessor 41 controls all operations of the handset 3. The microprocessor 41 is a programmable device. Programming for the microprocessor 41 resides in a read only memory (ROM) 43, flash EEPROM or the like. The microprocessor 41 also connects to a random access memory (RAM) 45, which provides temporary working storage of data used by the microprocessor. This ROM and RAM memory comprises the memory of the handset.

The keypad 37 supplies user input information to the microprocessor 41, and the microprocessor provides digital data signals to cause the display 39 to show appropriate information to the user. Under control of the microprocessor 41, the display 39 shows textual information, such as dialed numbers and name and number information regarding stored speed dialing lists. The display 39 also may have certain specialized indicators, such as a message-waiting indicator.

For digital wireless communications, the handset 3 includes a digital transceiver (XCVR) 47. The invention encompasses embodiments utilizing any digital transceiver that conforms to current or future developed digital wireless communication standards. For example, the transceiver 47 would be a TDMA or GSM unit, designed for cellular or PCS operation. In the preferred embodiments, the digital transceiver 47 is a CDMA transceiver. The transceiver 47 connects through RF send and receive amplifiers (not separately shown) to an antenna 53. The transceiver 47 provides two-way wireless communication of information, such as vocoded speech samples and user data. The transceiver 47 also provides two-way wireless communication of signaling data, for certain network functions such as registration and for call set-up.

The handset 3 also includes an analog transceiver 49. In North America, the typical analog transceiver 49 is an AMPS compliant transceiver for providing two-way voice-grade cellular communication service to and from a compatible base station 11. The bypass circuitry within the vocoder 35 selectively couples the microphone 31 and speaker 33 directly to the transceiver 49.

Both transceivers 47, 49 operate under program control from the microprocessor 41. The program of the microprocessor 41 may be permanently stored in the handset memory. Preferably, at least a portion of the program may be changed, for example, by downloading new programming to the handset 3 over the air-link. A portion of the stored programming controls operations of the microprocessor, and thus operations of the handset, in emergency call situations. The program recognizes emergency calls in several different situations, for example, when the user presses the "EMERGENCY" key on the keypad 37 or dials 911. One of the regular keys, such as the "9" key may be designated as a hot key for emergency speed dialing 911, and the programming would also recognize the activation of such a key as an instruction to initiate an emergency call.

Figure 3:
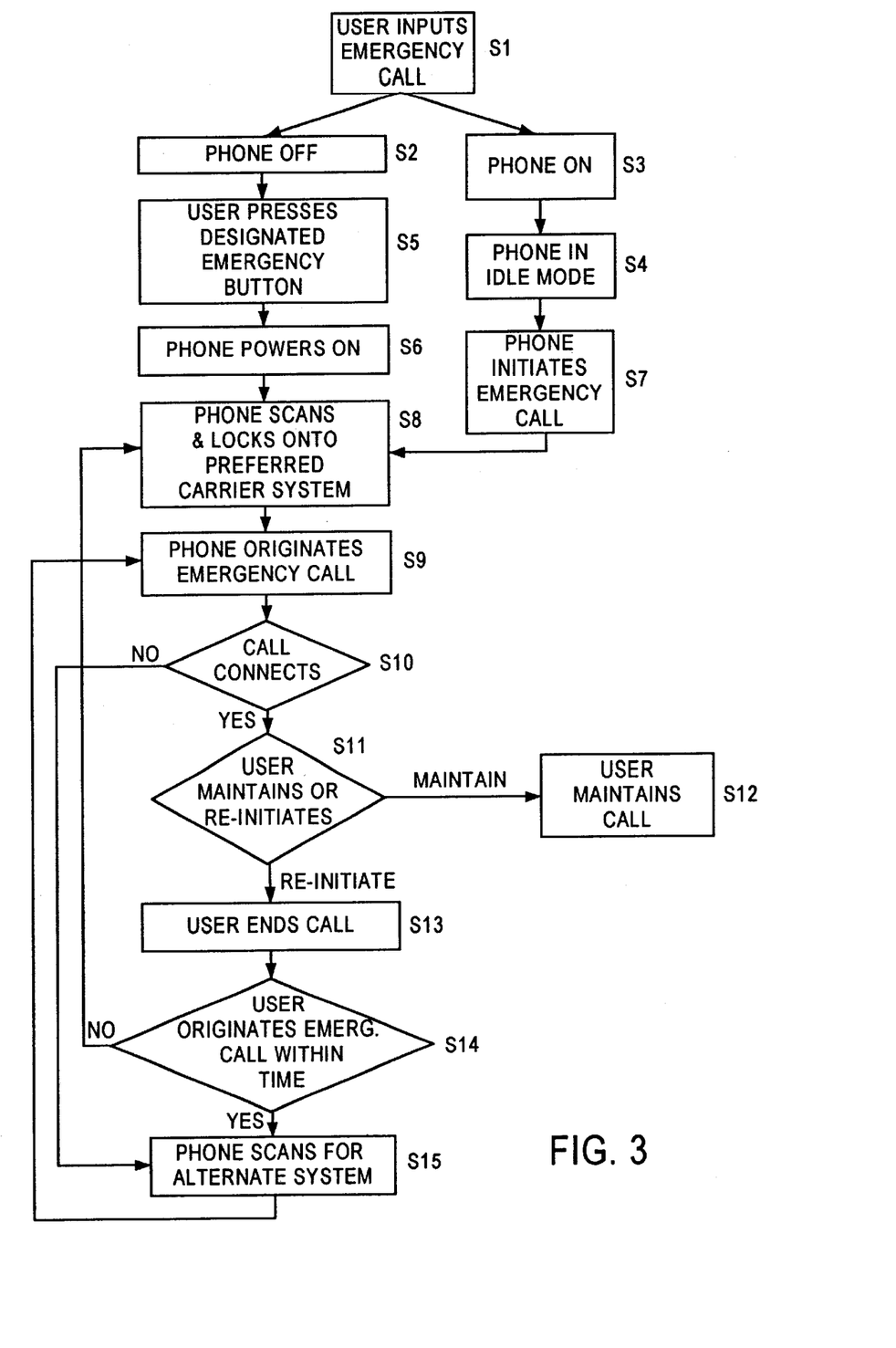
FIG. 3 is a flow chart illustrating the method of alternate carrier selection in accord with the invention.

FIG. 3 depicts the significant functional steps of the preferred alternate carrier selection operation in accord with the invention. The inventive methods are applicable to single-mode mobile stations and networks, whether digital or analog. It is assumed that the preferred handset or phone 3 and network 1 are utilized for the following description of an embodiment of the operation of the system, method, and handset of the invention. As described the preferred embodiment comprises a dual-mode analog and digital network and compatible mobile stations. The base stations include both analog and digital service transceivers, and the handsets preferably will be both analog and digital as well as dual-mode. The network may serve some analog-only and some digital-only mobile stations.

Turning to the flow chart in FIG. 3, at S1 the user originates an emergency call using the wireless handset 3. For example, the user may activate the EMERGENCY key or dial "911" and press the "SND" key shown in FIG. 2. At this point, the handset may be in an OFF condition or it may be ON and in an idle condition. This is shown by the bifurcated flow between S2, S3 and S1 in FIG. 3. The handset is so constructed and programmed that if the phone is OFF but its EMERGENCY button or other designated key is depressed, the phone is turned ON as is shown at S2, S5, and S6. If the phone is ON and idle, as shown at S3 and S4, it will immediately initiate an emergency call in response to any of the alternative emergency call inputs. This is shown at S7. If the handset is OFF, it will not be powered ON by an emergency call initiation attempt by any of the call initiation alternatives to the EMERGENCY key, i.e., the keyboard or speed dialing. The handset must first be turned on.

Thus, whether the phone is ON or OFF, both of the illustrated branches of the flow diagram culminate in the initiation or origination of an emergency call. The call may be manually initiated by depression of the EMERGENCY button or designated key, manual dialing, or speed dialing.

When the call is initiated or originated, the handset or phone 3 scans and locks onto the system of the preferred carrier in a known manner. This is shown at S8. If the preferred carrier operates a dual-mode system 1, as in this example, the call would be originated in that system using whichever of the dual mode technologies is programmed by that carrier as the preferred mode. In the instant example, it is assumed that the digital mode is preferred. Thus the call is initially routed to the preferred carrier's digital technology mode by the carrier's algorithm. If connection is established with the preferred carrier's digital technology, the process continues in that technology. However, if there is a failure to establish connection, then the system of that carrier will attempt to establish connection through its analog technology. If connection is established using the analog technology, then the call continues in that technology. Thus there is an initial selection of one of two routes available within the system of the preferred carrier.

Returning to the flow diagram of FIG. 3, the phone or handset 3 originates the emergency call at S9. This call from the handset either connects or fails to connect to the called public safety answering point or PSAP. This is shown at S10. If this attempt fails to establish connection, the methodology loops from S10 to S15, where the phone or handset 3 will scan for an alternate carrier system. Both of the technologies of the preferred carrier's system 1 having failed, the call attempt is now directed to the system 21 of another or competing carrier.

It will be appreciated that there are two embodiments of the invention in this optional methodology. In the first scenario the preferred carrier, having a dual-mode network or networks, attempts to establish connection in a first of the two modes of his network. This failing to establish connection, he then attempts to establish connection in the second of the two modes of his network or networks. This second attempt also failing, he then turns to a competitive carrier. In a second scenario the switch to a competitive carrier may immediately follow the failure of the first attempt at connection.

Returning to step S10, if either the first or the second dialing attempt results in a connection to the PSAP, the user has a decision as to whether to accept and maintain the connection (S11 to S12), or to terminate and re-initiate the call. In an emergency situation this would be a very prompt as opposed to leisurely decision. According to this feature of the invention the handset is programmed to initiate a timer sequence upon the user terminating the call. The timer measures a predetermined short interval, such as no more than a minute, to determine and signal whether the re-initiation by the user occurs within the period. If the re-initiation occurs within the period the handset scans for an alternate carrier.

Referring to the flow chart in FIG. 3, the initial connection from the phone to the PSAP is made at S10. Assume that the user makes a decision to re-initiate the call at S11 and ends or terminates the call at S13. The user then rapidly re-initiates the call at S14, within the predetermined time period, which is in this example one minute. This triggers a loop back of the algorithm of the invention through S15 to S9 where the call is re-initiated through the network of the alternate carrier selected at S15. The user is in control of the termination of the first connected call at S13, for any reason whatsoever. This may or may not be based on an objectively poor or failing connection. In this manner the invention provides a safer handling of the call than if the decision of the user could be over-ridden by basing the selection of carrier simply on an objective measurement, such as signal strength or other mechanically or electrically measured parameter. The processing loop will select an alternate carrier and set up a new connection through that carrier's network, each time the user subjectively chooses to end a call and quickly reinitiate a subsequent call. For example, if the user ends the second call and again reinitiates the emergency call within the time window, the phone scans for another carrier and establishes another call connection. This next alternate carrier may be a third compatible carrier in the region, or the phone may go back to the preferred carrier's network if no other carrier is available. If returning to the preferred carrier, the phone may select a different band and/or mode from that used on the first call via the preferred carrier's network.

The method of the invention is thus capable of overcoming a situation where the signal strength or quality of connection is excellent but the confidence level in locating the caller is unacceptable. As a result of this feature of being able to respond to non-signal quality parameters, the efficacy of the 911 or PSAP service in assisting a wireless handset user is significantly improved.

In the situation where the second call occurs outside the time window (S14) used to identify a substantially immediate redial of the emergency call, it is assumed that the second call is for some other reason. In this case, the processing branches from step S14 back to step S9 where the mobile phone 3 scans and locks onto the preferred carrier's system. The phone and network set up the second connection (S9, S10) through the preferred carrier's system using digital or analog technology, and processing continues as in the earlier example.

The algorithm represented by the flow chart in FIG. 3 is stored in the memory of the handset depicted in FIG. 2. The handset may be purchased by the user in a programmed condition. Alternatively the handset may be purchased in a programmable condition and subsequently programmed over the air, in a known manner.

Those skilled in the art will recognize that the present invention admits to a number of modifications, within the spirit and scope of the inventive concepts. For example, the selection of an alternate system at S15 may always select a competitive carrier as opposed to including an alternate system and technology of the preferred carrier within the possible choices considered at S15. It will be appreciated that the situation at S15 is different from the situation at S11 and S12. A call looped from S10 to S15 is not connected. A call arriving at S15 from S14 is a connected call which is being deliberately terminated.

The duration of the time period within which the re-initiation of the emergency call is attempted may be varied. The period must be sufficiently long to permit the handset user to make the decision to terminate the connection and re-initiate it, and sufficiently short to reasonably assure that the re-initiation is in fact an integral part of the same emergency, i.e., is a re-initiation and not an unrelated initiation.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A communication network for providing public emergency calling services, comprising:

a wireless network comprising a plurality of operating systems;

a public switched telephone network;

mobile wireless telephone stations linked via the wireless network and the public switched telephone network to each other and to wired telephone stations; and a public safety answering point linked to the wireless network and to the public switched telephone network;

each of said mobile wireless telephone stations detecting the termination and re-initiation within a predetermined time period of a call to said public safety answering point and directing the re-initiated call via an operating system other than an operating system which handled the terminated call.

2. A communication network as in claim 1, wherein the other operating system comprises an operating system of a carrier different from a carrier which handled the terminated call.

3. A communication network as in claim 1, wherein the other operating system comprises an operating system using a different technology than the technology which was used for the terminated call.

4. A communication network as in claim 1, wherein each of the mobile wireless telephone stations includes:

an audio frequency signal to sonic energy transducer;

a sonic audio energy to electrical audio signal transducer;

a transceiver coupled to the transducers;

a display;

a keypad having keys;

a microprocessor for controlling operations of the wireless telephone station; and a memory coupled to the microprocessor storing a program for said mobile wireless telephone station.

5. A communication network as in claim 4, wherein said keys include a key for single key-stroke initiation of a call to said public safety answering point.

6. A communication network as in claim 5, wherein said key for single key-stroke initiation of a call to said public safety answering point comprises a marked functional key.

7. A communication network as in claim 1, wherein said time period comprises a period of no more than substantially a minute.

8. A communication network as in claim 1, wherein said wireless network includes a cellular telephone network.

9. A communication network as in claim 1, wherein said wireless network includes a personal communication service (PCS) network.

10. A communication network as in claim 1, wherein said wireless network includes a satellite or SMR network.

11. A communication network as in claim 1, wherein said wireless network includes a dual mode network providing digital as well as analog service.

12. A communication network for providing public emergency calling services, comprising:

a public wireless network comprising networks of a plurality of carriers;

a public switched telephone network;

mobile wireless telephone sets linked via the public wireless network and the public switched telephone network to each other and to wired telephone sets; and a public safety answering point linked to said wireless network and to said public switched telephone network;

one of said mobile wireless telephone sets detecting initiation therefrom within a predetermined time period of two calls to said public safety answering point and directing the second of said calls via a network of a carrier different from a network of a carrier which handled the first of said calls.

13. A communication network as in claim 12, wherein said time period comprises a period of no more than substantially a minute.

14. A communication network as in claim 12, wherein the one mobile wireless telephone set comprises:

an audio frequency signal to sonic energy transducer;

a sonic audio energy to electrical audio signal transducer;

a vocoder;

a transceiver;

a display;

a keypad having numeric keys;

operational keys;

a microprocessor for controlling operations of the one wireless telephone set; and a memory coupled to the microprocessor;

said memory storing a program for the microprocessor control of said one mobile wireless telephone set including the direction of the first and second of said calls.

15. A wireless telephone set for providing public emergency calling services via a communication network which includes:

said wireless telephone hand set and other wireless telephone sets linked via a public wireless network and a public switched telephone network to each other and to wired telephone sets; and a public safety answering point linked to said public wireless network and to said public switched telephone network via multiple operating systems;

the wireless telephone set comprising:

a wireless transceiver for selectively establishing telephone call communications via the operating systems; and a programmed controller coupled to the wireless transceiver for detecting the initiation therefrom within a predetermined time period of multiple calls to said public safety answering point and directing the second of said calls via an operating system different from an operating system which handled the first of said calls.

16. A wireless telephone set as in claim 15, further comprising:

an audio frequency signal to sonic energy transducer;

a sonic audio energy to electrical audio signal transducer;

a vocoder coupled to the transducers and to the wireless transceiver a display;

a keypad having numeric keys;

operational keys; and a memory storing a program of the controller for control of operations of the said wireless telephone set during said calls.

17. A wireless telephone set as in claim 16, wherein said keys include a key for single key-stroke initiation of a call to said public safety answering point.

18. A wireless telephone set as in claim 17, wherein said key for single key-stroke initiation of a call to said public safety answering point comprises a marked operation key separate from the numeric keys.

19. A wireless telephone set as in claim 18, wherein the programmed controller controls the transceiver to select an operating system supporting a different technology, for the second of said calls.

20. A wireless telephone set as in claim 15, wherein the controller controls the transceiver to select an operating of a different carrier, for the second of said calls.

21. A wireless telephone set as in claim 15, wherein the controller automatically powers-up the transceiver and initiates the first of said calls, if the controller detects activation of a designated emergency key while power to the telephone set is substantially off.

22. A method for providing public emergency calling services to one wireless telephone station in a communication network including wireless telephone stations linked by multiple operating systems via a public wireless telephone network to each other and to wired telephone stations and to a public safety answering point, comprising the steps of:

detecting the termination and re-initiation within a predetermined time period of a call from the one wireless telephone station to said public safety answering point; and     directing the re-initiated call via a different operating system than an operating system which handled the terminated call.

23. A method as in claim 22, wherein said re-initiated call is directed at least partially via the operating system of a carrier different than a carrier that handled the terminated call.

24. A method as in claim 23, wherein the different carrier utilizes a different technology than used by the carrier that handled the terminated call.

25. A method as in claim 22, wherein said time period comprises a period of no more than substantially a minute.

26. A method of establishing emergency call communication from a mobile telephone station, comprising:

while in a power-down state of the mobile telephone station, detecting user activation of a designated emergency key input;

in response to the detection, powering-up the mobile telephone station;

automatically initiating a telephone call through a wireless telephone network to a public safety answering point,     recognizing if a user terminates the telephone call to the public safety answering point and subsequently inputs an instruction to the mobile telephone station to initiate another call to the public safety answering point within a predetermined interval of the termination; and     in response to the recognition, initiating another telephone call through the wireless telephone network to the public safety answering point,     wherein each of the calls to the public safety answering point utilizes a different operating system of the wireless telephone network.

27. A method as in claim 26, wherein each of the operating systems comprises a wireless telephone network of a different carrier.

28. A method as in claim 27, wherein each of the operating systems utilizes a different wireless technology.

29. A method as in claim 28, wherein one of the technologies provides analog services, and another of the technologies provides digital services.

30. A method as in claim 26, wherein each of the operating systems utilizes a different wireless technology.

31. A method as in claim 30, wherein one of the technologies provides analog services, and another of the technologies provides digital services.

* * * * *